(12) United States Patent
Sarawat et al.

(10) Patent No.: US 10,873,881 B2
(45) Date of Patent: *Dec. 22, 2020

(54) WIRELESS ACCESS POINT LOAD BALANCING

(71) Applicant: Cable Television Laboratories, Inc., Louisville, CO (US)

(72) Inventors: Vikas Sarawat, Broomfield, CO (US); Bernard McKibben, Broomfield, CO (US); Neeharika Allanki, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 386 days.

This patent is subject to a terminal disclaimer.

(21) Appl. No.: 15/626,436

(22) Filed: Jun. 19, 2017

(65) Prior Publication Data

US 2017/0295518 A1 Oct. 12, 2017

Related U.S. Application Data

(63) Continuation of application No. 14/569,669, filed on Dec. 13, 2014, now Pat. No. 9,686,718.

(60) Provisional application No. 61/916,064, filed on Dec. 13, 2013.

(51) Int. Cl.
| | |
|---|---|
| *H04W 28/00* | (2009.01) |
| *H04W 28/08* | (2009.01) |
| *H04W 48/06* | (2009.01) |
| *H04W 28/22* | (2009.01) |
| *H04W 28/02* | (2009.01) |

(52) U.S. Cl.
CPC .......... *H04W 28/08* (2013.01); *H04W 28/22* (2013.01); *H04W 48/06* (2013.01); *H04W 28/02* (2013.01); *H04W 28/0236* (2013.01)

(58) Field of Classification Search
CPC . H04W 28/02; H04W 28/0236; H04W 28/08; H04W 28/22; H04W 48/06
See application file for complete search history.

(56) References Cited

U.S. PATENT DOCUMENTS

| | | | |
|---|---|---|---|
| 6,832,255 B1 | 12/2004 | Rumsewicz et al. | |
| 7,784,076 B2 * | 8/2010 | Demircin | H04N 19/172 370/465 |
| 8,463,308 B2 * | 6/2013 | Matsuo | H04W 52/146 370/328 |
| 2004/0054774 A1 | 3/2004 | Barber et al. | |

(Continued)

OTHER PUBLICATIONS

Wi-Fi Provisioning Framework Specification WR-SP-WiFi-MGMT-104-140311, CableLabs, Mar. 11, 2014.

(Continued)

*Primary Examiner* — Phuc H Tran
(74) *Attorney, Agent, or Firm* — Great Lakes Intellectual Property, PLLC

(57) ABSTRACT

Managing wireless access points and/or other devices providing wireless signaling to multiple clients is contemplated. The wireless access point may be managed according to a load balancing strategy directed towards achieving desired network throughput using forced disassociation of clients based on traffic type or other service related indicators and/or force disassociation of roaming partners based on neighboring access point capabilities.

19 Claims, 4 Drawing Sheets

(56) References Cited

U.S. PATENT DOCUMENTS

| | | | |
|---|---|---|---|
| 2004/0223470 A1* | 11/2004 | Smith | H04L 63/10 370/332 |
| 2007/0291732 A1* | 12/2007 | Todd | H04L 12/66 370/351 |
| 2008/0233951 A1 | 9/2008 | Uchida et al. | |
| 2012/0265810 A1 | 10/2012 | Reid et al. | |
| 2012/0281609 A1 | 11/2012 | Kasslin et al. | |
| 2012/0300746 A1 | 11/2012 | Ibrahim et al. | |
| 2014/0010174 A1* | 1/2014 | Matsuo | H04W 52/146 370/329 |

OTHER PUBLICATIONS

Written Opinion of corresponding PCT application PCT/US14/70186 published Mar. 17, 2015, USPTO as ISA.

IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 1: Radio Resource Measurement of Wireless LANs, IEEE, Jun. 12, 2008.

IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 9: Interworking with External Networks, IEEE, Feb. 25, 2011.

Wi-Fi Provisioning Framework Specification WR-SP-WiFi-MGMT-I04-140311, CableLabs, Mar. 11, 2014.

Wi-Fi Radio Resource Management (RRM)/Self Organizing Networks (SON) Technical Report WR-TR-RRM-SON-V01-140926, CableLabs, Sep. 26, 2014.

* cited by examiner

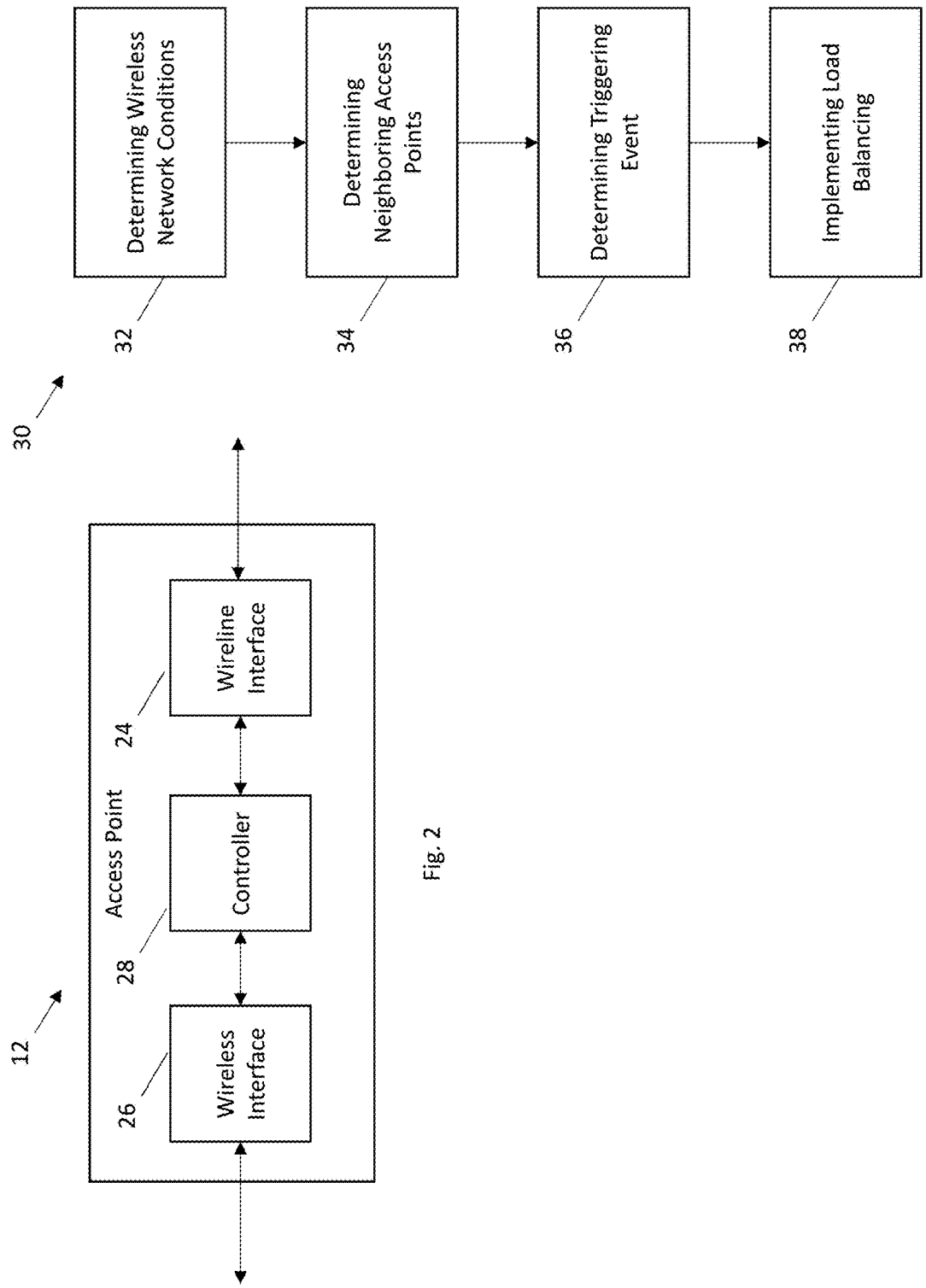

WIRELESS ACCESS POINT LOAD BALANCING

CROSS-REFERENCE TO RELATED APPLICATIONS

This application is a continuation of U.S. patent application Ser. No. 14/569,669, filed Dec. 13, 2014, which in turn claims the benefit of U.S. provisional application No. 61/916,064, filed Dec. 13, 2013, the disclosures and benefits of which are hereby incorporated in their entireties by reference herein.

TECHNICAL FIELD

The present invention relates to managing wireless access points and/or other devices providing wireless signaling to multiple clients, such as but not necessary limited to managing the access point according to a desired load balancing process.

BACKGROUND

Many wireless networks suffer from a problem called a sticky client scenario where a client with lower relative signal strength (RSS) value may not be dissociated from a corresponding access point and instead continue to consume valuable airtime, effectively reducing aggregate network throughput. U.S. patent application Ser. No. 14/537,845, entitled Network Traffic Prioritization, the disclosure of which is hereby incorporated by reference in its entirety, provides a detailed analysis of the sticky client scenario affecting network throughput when an access point is tasked with supporting community Wi-Fi. While the present invention is not necessary limited to community Wi-Fi related access points, the noted patent application is believed to be a useful reference for detailing network congestion and other throughput side effects associated with a sticky client, a client connected to an edge of a wireless network or a client otherwise having relatively slow communication speeds A common solution to the sticky client problem is to simply prevent clients having a RSS below a desired level from continuing to consume valuable airtime. This solution can be problematic as it fails to consider the content, activities, agreements or other parameters associated with the sticky client indicating a need to keep a sticky client even if network throughput is compromised. One non-limiting aspect of the present invention contemplates ameliorating this problem through load balancing implemented without arbitrarily or blindly preventing clients, including sticky clients, from accessing wireless services.

BRIEF DESCRIPTION OF THE DRAWINGS

FIG. 2 illustrates an access point in accordance with one non-limiting aspect of the present invention.

FIG. 3 illustrates a flowchart for a method of facilitating load-balancing in accordance with one non-limiting aspect of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
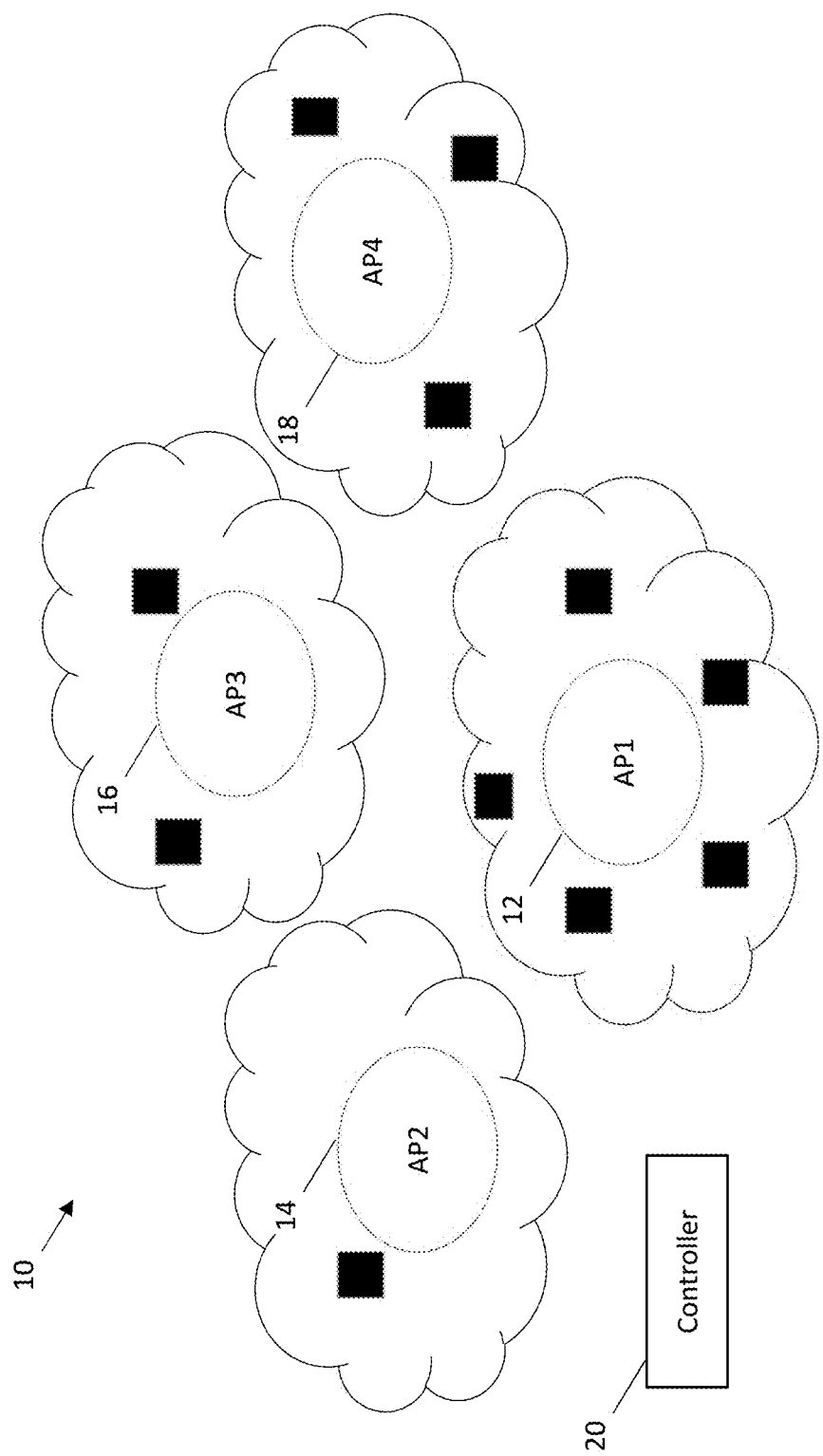
FIG. 1 illustrates a wireless system in accordance with one non-limiting aspect of the present invention.

FIG. 1 illustrates a wireless system 10 in accordance with one non-limiting aspect of the present invention. The system 10 depicts an exemplary environment having a plurality of wireless access points 12, 14, 16, 18 tasked with facilitating wireless services for a plurality of wireless clients (shown with boxes). A controller 20 configured in accordance with the present invention may be included to facilitate managing one or more of the access points 12, 14, 16, 18 according to a load balancing stratagem directed towards implementing disassociations in a manner advantageous to achieving desired network throughput. The controller 20 may be a standalone, network-based device, as shown, and/or integrated within one or more of the access points 12, 14, 16, 18 and configured to facilitate the operations contemplated herein. The access points 12, 14, 16, 18 may be Wi-Fi, cellular or other wireless capable devices having capabilities sufficient to provide wireless spectrum to authenticated clients or clients otherwise having completed a sign-on operation or similar handshake therewith. The access points 12, 14, 16, 18 may be connected to other wired/wireless networks and/or a backbone network having capabilities sufficient to facilitate long-haul transport of signaling associated with the one or more connected clients.

Wireless signaling between the access points 12, 14, 16, 18, clients and/or controller 20 may be compliant with the Institute of Electrical and Electronics Engineers (IEEE) 802.11 series of standards, the disclosures of which are hereby incorporated by reference in their entireties herein. The attendant wireless signaling may operate according to Part 11: Wireless LAN Medium Access Control (MAC) and Physical Layer (PHY) Specifications, Amendment 1: Radio Resource Measurement of Wireless LANs (IEEE 802.11k) and/or Amendment 9: Interworking with External Networks (Hotspot 2.0, IEEE 802.11u). The wireless signaling may correspond that described in the CableLabs technical report for Wireless Wi-Fi entitled Wi-Fi Radio Resource Management (RRM)/Self Organizing Networks (SON) Technical Report (WR-TR-RRM-SON-V01-140926) and the CableLabs specification entitled Wi-Fi Provisioning Framework Specification (WR-SP-WiFi-MGMT-I04-140311), the disclosures of which are hereby incorporated by reference in its entirety herein. The wireless signaling may correspond with cellular standards, such as Long-Term Evolution (LTE) based on the Global System for Mobile Communications (GSM)/Enhanced Data rates for GSM Evolution (EDGE) and Universal Mobile Telecommunications System (UMTS)/High Speed Packet Access (HSPA) network technologies developed by the 3rd Generation Partnership Project (3GPP) as specified in its Release 8 and 9 document series and/or TS 36.201, 36.300, 36.304, 36.306, 36.321, 36.322, 36.323, 36.331, 36.401, 36.306 and 36.902 (self-organizing Network (SON)), the disclosures of which are hereby incorporated by reference in their entireties herein. Of course, the access points 12, 14, 16, 18 and the clients may optionally be considered as Internet of Things (IoT) devices and capable of Time Division Multiple Access (TDMA), Orthogonal Frequency Division Multiplexing (OFDM), Orthogonal Frequency Division Multiple Access (OFDMA), Single Carrier Frequency Division Multiple Access (SC-FDMA), Data Over Cable Service Interface Specifications (DOCSIS) 3.x, Long Term Evolution (LTE), LTE-Advanced (LTE-A), Wi-Max, Wi-Fi, Digital Video Broadcasting-Terrestrial (DVB-T), Digital Video Broadcasting-Handheld (DVB-H), Zigbee, ZWave etc., the disclosures of which are hereby incorporated by reference in their entireties.

A wireless signaling range of each access point 12, 14, 16, 18 is generically illustrated in a non-overlapping manner for exemplary purposes as the associated wireless signaling range may vary depending on signal strength, environmental obstructions, antenna configuration, etc. The wireless signaling range of each access point 12, 14, 16, 18 may overlap with one or more of the other access points 12, 14, 16, 18 and/or clients connected to one access point 12 may be within wireless signaling range of one or more of the other access points 14, 16, 18. The access points 12, 14, 16, 18 and the clients may connect or communicate with one or more of the access points 12, 14, 16, 18 as a function of various messages exchange therebetween. A client within signaling range of multiple access points 12, 14, 16, 18 may decide which one of the multiple access points 12, 14, 16, 18 to connect with as a function of advertisement messages transmitted from the corresponding access point 12, 14, 16, 18. IEEE 802.11u, for example, allows a client to query an access point 12, 14, 16, 18 for information like a name of the associated access point operator, capabilities of the associated wireless network, emergency alert information, geospatial and civic locations of the access point, potential roaming partners, etc. using Access Network Query Protocol (ANQP) protocol. The client may use this information to select one of the access points 12, 14, 16, 18 and thereafter negotiate with the selected access point for use of its wireless spectrum. The access points 12, 14, 16, 18 may accept or deny access requests depending on roaming agreements, subscriptions and any number of other influences.

IEEE 802.11k, section 5, describes additional measurements that may be utilized in accordance with the present invention to facilitate selecting and assessing performance of various access points 12, 14, 16, 18 as a function of a radio resource measurement (RRM). The RRM may include the following measurements: beacon, frame, channel load, noise histogram, STA statistics, location configuration information (LCI), neighbor report, link measurement and transmit stream/category measurement. IEEE 802.11k defines each measurement as follows:

Beacon: The Beacon request/report pair enables a STA to request from another STA a list of APs it can receive on a specified channel or channels. This measurement may be done by active mode (like active scan), passive mode (like passive scan), or beacon table modes. If the measurement request is accepted and is in passive mode, a duration timer is set and the measuring STA monitors the requested channel, measures beacon, probe response, and measurement pilot power levels (RCPI), and logs all beacons, probe responses, and measurement pilots received within the measurement duration. If the measurement request is in active mode, the measuring STA sends a probe request on the requested channel at the beginning of the measurement duration, then monitors the requested channel, measures beacon, probe response, and measurement pilot power levels (RCPI), and logs all beacons, probe responses, and measurement pilots received within the measurement duration. If the request is beacon table mode, then the measuring STA returns a Beacon Report containing the current contents of any stored beacon information for any channel with the requested SSID and BSSID without performing additional measurements.

Measurement Pilot: The Measurement Pilot frame is a compact Action frame transmitted periodically by an AP at a small interval relative to a Beacon Interval. The Measurement Pilot frame provides a subset of the information provided in a Beacon frame, is smaller than a Beacon, and is transmitted more often than a Beacon. The purpose of the Measurement Pilot frame is to assist a STA with scanning.

Frame: The frame request/report pair returns a picture of all the channel traffic and a count of all the frames received at the measuring STA. For each unique Transmitter Address, the STA reports the Transmitter Address, number of frames received from this transmitter, average power level (RCPI) for these frames, and BSSID of the transmitter.

Channel load: The channel load request/report pair returns the channel utilization measurement as observed by the measuring STA.

Noise histogram: The noise histogram request/report pair returns a power histogram measurement of non-IEEE 802.11 noise power by sampling the channel when virtual carrier sense indicates idle and the STA is neither transmitting nor receiving a frame.

STA statistics: The STA statistics request/report pair returns groups of values for STA counters and for BSS Average Access Delay. The STA counter group values include: transmitted fragment counts, multicast transmitted frame counts, failed counts, retry counts, multiple retry counts, frame duplicate counts, Request to Send (RTS) success counts, RTS failure counts, Acknowledgement (ACK) failure counts, received fragment counts, multicast received frame counts, FCS error counts, and transmitted frame counts. BSS Average Access Delay group values include: AP average access delay, average access delay for each access category, associated STA count, and channel utilization Location: The Location request/report pair returns a requested location in terms of latitude, longitude, and altitude. It includes types of altitude such as floors and permits various reporting resolutions. The requested location may be the location of the requestor (e.g., Where am I?) or the location of the reporting STA (e.g., Where are you?)

Measurement pause: The measurement pause request is defined, but no report comes back from this request. The measurement pause permits the inclusion of a quantified delay between the execution of individual measurements that are provided in a series within a measurement request frame. The measurement pause used as the last measurement in a frame provides control of the measurement period when measurement request frames are to be repeated.

Neighbor report: The neighbor report request is sent to an AP, which returns a neighbor report containing information about known neighbor APs that are candidates for a service set transition. Neighbor reports contain information from the table dot11RRMNeighborReportTable in the MIB concerning neighbor APs. This request/report pair enables a STA to gain information about the neighbors of the associated AP to be used as potential roaming candidates.

Link measurement: The link measurement request/report exchange provides measurements of the RF characteristics of a STA to STA link. This measurement indicates the instantaneous quality of a link.

Transmit stream/category measurement: The Transmit Stream/Category measurement is a request/report pair that enables a QoS STA to inquire of a peer QoS STA the condition of an ongoing traffic stream link between them. The Transmit Stream/Category Measurement Report provides the transmit-side performance metrics for the measured traffic stream. Trigger conditions included in the Transmit Stream/Category Measurement Request may initiate triggered Transmit Stream/Category Measurement Reports upon detection of the trigger condition.

FIG. 2 illustrates an access point 12 in accordance with one non-limiting aspect of the present invention. The access point 12 may include a wireline interface 24 for exchanging signaling with a backbone or long-haul network over a wired connection and a wireless interface 26 for exchanging wireless signals with clients within a corresponding signaling range. The access points 12, 14, 16, 18 and clients may optionally be configured to facilitate Multiple-Input Multiple-Output (MIMO) communications, such as that associated with U.S. patent application Ser. Nos. 14/181,640, 14/181,641, 14/181,643 and 14/181,645, the disclosures of which are hereby incorporated by reference in their entireties herein. The access point 12 may include a controller 28 having a processor and a computer-readable medium with a plurality of non-transitory instructions operable to facilitate controlling the access point 12 to facilitate the load-balancing management contemplated herein. The access point 12 may be considered as a gateway, a cable modem, a router, a eNodeB be, a set-top box (STB), a phone or virtually any other device having capabilities consistent with the operations associated with the present invention (access points may also operate as clients and clients may also act as access points). The access point 12 is shown to include the wireline interface 24 for exemplary purposes and as the wireline interface 24 may be replaced with a wireless interface or eliminated.

FIG. 3 illustrates a flowchart 30 for a method of facilitating load-balancing in accordance with one non-limiting aspect of the present invention. Block 32 relates to a primary access point, i.e., the access point for which load balancing is desired, determining network conditions of its wireless network/spectrum. The network conditions may be assessed as a function of the RRM measurements and other information collected by clients or transmitted from the primary access point or neighboring secondary access points. The network condition analysis may include determining relative signal strength (RSS) between the access point and each connected client, an upload rate, a download rate, a throughput, an operating channel, etc. Block 34 relates to determining access points neighboring the primary access point, which may be referred to as secondary access points. The secondary access points may be those within wireless signaling range of the primary access point or having a portion of their wireless spectrum overlapping with the primary access point and/or one or more of the clients connected to the primary access point. The secondary access points may be determined as a function of advertisements being broadcasted therefrom including network condition related information similar to those described above with respect to the primary access point.

Block 36 relates to determining one or more triggering events. The triggering events may correspond with activities intended to instigate a particular load-balancing operation. One non-limiting aspect of the present invention contemplates implementing load-balancing when a throughput associated with the primary access point drops below a desired threshold, which can occur in the event a sticky client is present or the number of clients or nature of the communications undertaken with the clients exceeds a desired level of operation. While the present invention is predominately described with respect to utilizing throughput as a trigger for instigating load-balancing, the load-balancing contemplated herein may be performed in response to any number of conditions and need not necessarily result from poor network throughput and/or need not necessary be implemented until desired network throughput is achieved. Block 38 relates to implementing a load-balancing activity when the throughput drops below the desired threshold or other suitable triggering event occurs. The load-balancing may be characterized by forcing a disassociation until desirable throughput levels are achieved or the need to take further corrective action otherwise ceases.

Figure 4:
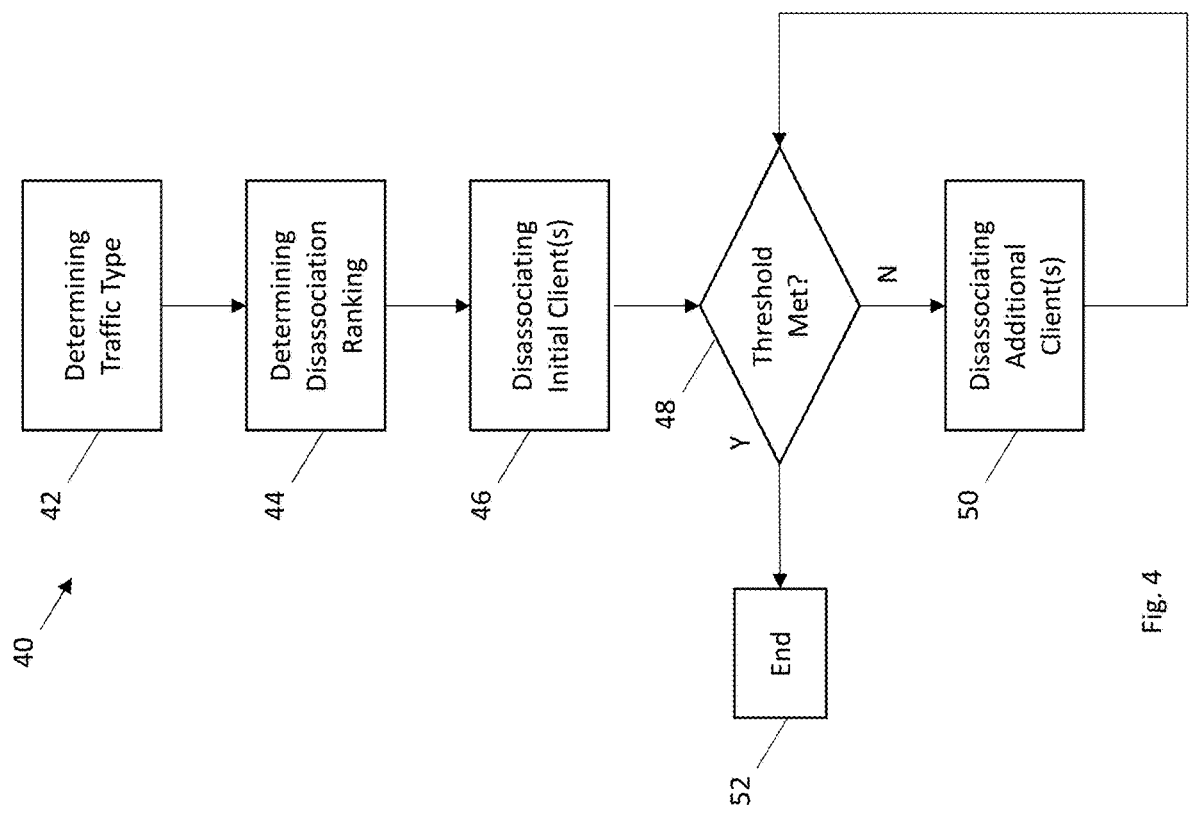
FIG. 4 illustrates a flowchart for a disassociation process contemplated to facilitate load-balancing in accordance with one non-limiting aspect of the present invention.

FIG. 4 illustrates a flowchart 40 for a disassociation process contemplated to facilitate load-balancing in accordance with one non-limiting aspect of the present invention. The dissociation process may be characterized by the primary access point forcing dissociation of one or more authenticated/connected clients, i.e., preventing access to the wireless spectrum, with the aim of dissociating clients until network throughput reaches desirable levels. Block 42 relates to the primary access point determining a traffic type for traffic being carried over its wireless spectrum. The traffic type may be identified on a per-client basis such that each client is assigned a particular traffic type. In the event a client utilizes multiple traffic types or switches frequently between traffic types, the assigned or determined traffic type may correspond with the most prevalent or average type of traffic. One non-limiting aspect of the present invention contemplates identifying traffic type as one of legacy video, legacy voice and data, non-legacy video and non-legacy voice and data. The legacy and non-legacy determination may be based on a protocol or standard being used to facilitate the attendant voice, data or video service. Legacy clients may be those associated with older generation clients, such as 802.11b/g clients, when compared to non-legacy or new generating clients, such as 802.11n clients, which may be much faster and efficient in comparison to the legacy clients. Legacy clients impact the performance of the entire network by demanding more airtime and by degrading the average throughput of the network as a whole.

Block 44 relates to determining a disassociation ranking. The disassociation ranking may arrange each of the clients in an order of disassociation to be followed until desired network throughput is achieved. One non-limiting aspect of the present invention contemplates ranking the clients such that clients associated with one traffic type are ranked higher that those associated with another traffic type, e.g., the legacy video clients may be ranked for disassociation prior to the legacy voice and data clients, the legacy voice and data clients may be ranked for disassociation prior to the non-legacy video clients and the non-legacy video clients may be ranked for disassociation prior to the non-legacy voice and data clients. In the event multiple clients are categorized into to a common traffic type, such as when multiple legacy video clients are determined, the clients may be further ranked according to RSS, such as by ordering clients with lower RSS for disassociation prior to clients having RSS. Optionally, any client, regardless of traffic type, may be omitted from disassociation if their corresponding RSS is above a minimum threshold.

Blocks 48, 50, 52 relate to iteratively disassociating clients according to the disassociation ranking until network throughput meets or exceeds a desired threshold. The disassociation process may be performed on a one-to-one or client-by-client basis whereby one client is disassociated and throughput checked prior to disassociating another client or according to a batching of clients, e.g., all clients in a certain traffic type may be disassociated at the same time or the total number of clients needed to return throughput to desired levels may be estimated for the purposed of a batched disassociation where multiple clients are disassociated at the same time. The disassociation process may also include recommending a new access point to each disassociated client, such as one of the secondary access points determined to be in proximity to the primary access point. The second access point recommended to the clients may be based on an affiliation, e.g., the recommended access point may be one associated with a service provider of the primary access point, or the recommended access point may be identified as a roaming partner having an agreement or other authorization to support clients from other service providers.

An advertisement or other message may be provided to the disassociated clients for the purposes of recommending the new access point. In the event multiple secondary access points are suitable for a particular client being disassociated, the recommended access point may be determined based on a ranking where weighted values are assigned for RSS, number of clients and/or roaming partners. The highest ranked secondary access point may be the one having the greatest RSS relative to the disassociated client. Optionally, if the RSS for multiple second access points is relatively close or within a common range, the preferred second access point may be the one having the least number of clients or having an affiliation with the dissociated client, e.g., preference may be giving for a second access point affiliated with the same service provider as the primary access point over a roaming partner. The upload and download rates of the secondary access points may also be weighted to determine the recommended access point, such as recommending the access point having a greater download rate if the dissociated client is identified with a traffic type requiring greater amounts of data.

Figure 5:
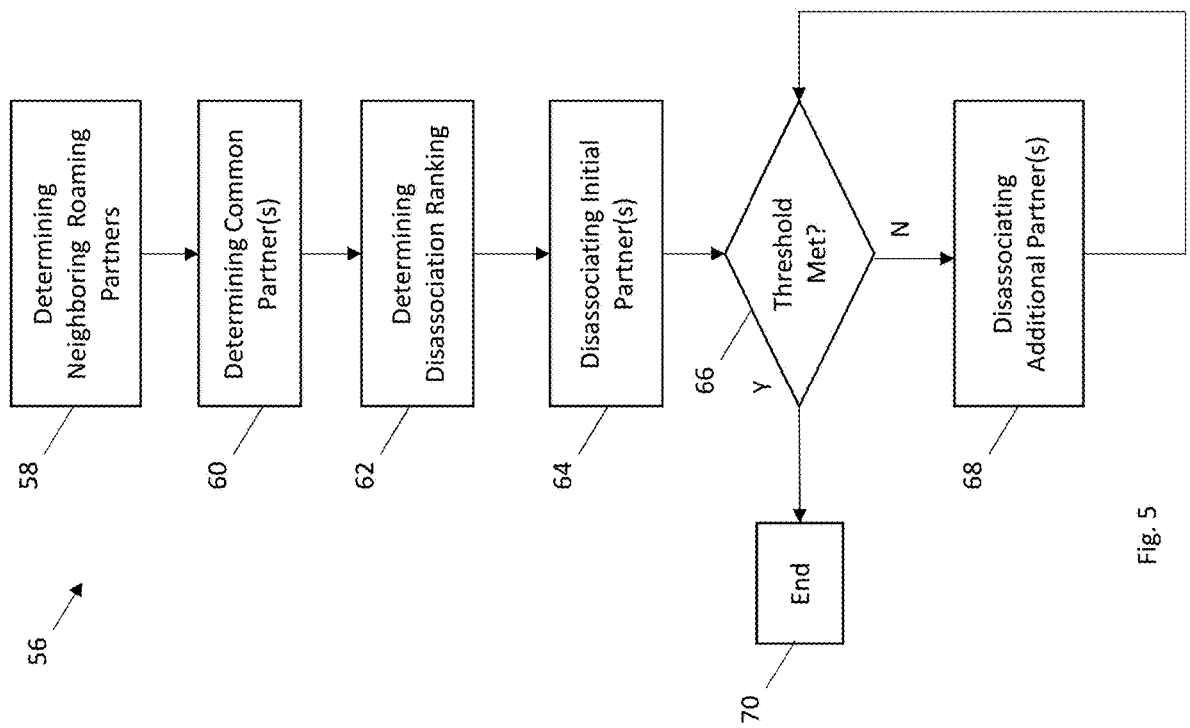
FIG. 5 illustrates a flowchart for an advertisement process contemplated to facilitate load-balancing in accordance with one non-limiting aspect of the present invention.

FIG. 5 illustrates a flowchart 56 for a disassociation process contemplated to facilitate load-balancing in accordance with one non-limiting aspect of the present invention. The dissociation process may be characterized by the primary access point forcing dissociation of advertised roaming partners with the aim of preventing clients affiliated with a roaming partner from connecting to the primary access point until network throughput of the primary access point reaches desirable levels. Block 58 relates to determining neighboring roaming partners associated with secondary access points within proximity to the primary access point and/or one or more clients within the wireless signaling range of the primary access point. The roaming partners may be characterized according to a service level agreement or other relationship where access points associated with certain service providers agree to grant access to clients associated with non-affiliated service providers, such as to enable roaming or other mobility-based access to services when outside of a particular service provider's coverage area.

The table shown below may be generated to track neighboring roaming partners where the primary access point may correspond with AP1 and the secondary access points may correspond with AP2, AP3 and AP4 and RP designates a particular roaming partner.

| List of neighbors | RSS | Number of associated clients | List of all the roaming partners being advertised by each neighbor |
|---|---|---|---|
| AP2 | −40 | 1 | RP2, RP3, RP4 |
| AP3 | −50 | 2 | RP1, RP2, RP3 |
| AP4 | −60 | 3 | RP3, RP4, RP5 |

Block 60 relates to determining the roaming partners of the primary access point in common with the neighboring, secondary access points. Assuming the primary access point advertises roaming partners RP1, RP2, RP3, RP7 and RP8, the following table may be generate to indicate the roaming partners unique (not common) to each of the secondary access points.

| Name of the serving AP | List of the roaming partners that are unique to the serving AP when compared to its neighbors. |
|---|---|
| AP2 | RP1, RP7, RP8 |
| AP3 | RP7, RP8 |
| AP4 | RP1, RP2, RP7, RP8 |

Block 62 relates to determining a disassociation ranking for the neighboring roaming partners. The table shown below illustrates an exemplary ranking where a weighting of RSS and load (number of clients) is utilized.

| AP1's neighbors | RSS | No. of associated clients (Load) | List of common roaming partners with AP1 | Rank (Least load, Best RSS) |
|---|---|---|---|---|
| AP2 | −40 | 1 | RP2, RP3 | 1 |
| AP3 | −50 | 2 | RP1, RP2, RP3 | 2 |
| AP4 | −60 | 3 | RP3 | 3 |

AP2 is ranked first due to having the greatest RSS and the lowest load. Optionally, other orders may be generated as a function of RSS alone (e.g., in order of RSS), number of common roaming partners (e.g., the access point with the most roaming partners in common may be ranked first) and/or some combination thereof. Blocks 66, 68, 70 relate to dissociating roaming partners associated with the top ranked access point and then checking network throughput before iteratively disassociating roaming partners of additional access points. The iterative process may be referred to as an advertisement process whereby the primary access point is prevented from advertising availability of the common roaming partners so that future connections for those roaming partners can instead be serviced with one of the neighboring access points, which should eventually decrease the number of connected clients and increase throughput to the desired level. The foregoing disassociates all roaming partners in common with the selected one or more secondary access points as one example of a disassociation pattern as other patterns may similarly be used, such as by disassociating individual roaming partners on a one-by-one basis instead of all the roaming partners associated with a particular access point.

The client disassociation process of FIG. 4 and the advertisement process of FIG. 5 may be combined to provide a hybrid disassociation methodology where clients are forced to associate with another access point and new connections for particular roaming partners are prevented. The hybrid process may be beneficial, for example, when the primary access point is deployed in an environment where clients are frequently connecting and disconnecting from networks, such as when operating according to a mobility mode or in an heavily trafficked area, as the forced disassociation may be helpful in directing sticky clients to other access points and preventing new sticky clients associated with roaming partners from connecting. The ability to assess neighboring access points and their capabilities may be particularly beneficial in providing recommendations for continued access without disrupting the client experience when network throughput starts to drop below desired minimums.

As supported above, one non-limiting aspect of the present invention contemplates meeting subscriber demand for mobile data at increasingly significant rates by turning to large-scale Wi-Fi networks. Industry initiatives working to enable an operator to establish 100's of roaming partner Wi-Fi operator relationships may be capitalized to provide more coverage for their subscribers, particularly to deploy public Wi-Fi SSIDs within residences and SMBs in manner that compensates for the dynamic or transient nature as subscribers move or change service providers. The present invention allows operators to leverage partner networks to meet traffic demand with an efficient method for detecting local presence and loading conditions of many partner Wi-Fi networks for the sake of mobile data traffic load balancing. The present invention also combats a common problem called the sticky client scenario by enabling an AP to not only take the RSS into consideration while balancing the network load but to also consider QoS priorities for certain traffic types, e.g., dissociating legacy traffic types prior to non-legacy traffic types. The AP contemplated by the present invention can build tables consisting of each of its neighboring APs along with information like the average throughput rates, number of clients, RSS for each of its neighbor, and once the AP has the information from its neighboring APs, the AP can then send a forceful dissociation to the dissociated client based on the algorithms and processes described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for load balancing a primary access point comprising:
   determining a plurality of clients having completed an association process sufficient for obtaining access to a wireless spectrum available through the primary access point;
   determining a minimum throughput to represent a minimum data rate for wireless signaling carried over the wireless spectrum between the plurality of clients and the primary access point;
   determining a throughput to represent an active data rate for wireless signaling being carried over the wireless spectrum between the plurality of clients and the primary access point;
   determining a plurality of secondary access points in proximity to the primary access point, the secondary access points having wireless spectrum available to identified roaming partners; and
   implementing an advertisement process when the throughput is less than the minimum throughput, the advertisement process including controlling the primary access point to cease advertising wireless spectrum availability for one or more roaming partners in common with the identified roaming partners.

2. The method of claim 1 further comprising:
   determining the plurality of secondary access points to include at least a first access point and a second access point; and
   implementing the advertisement process as follows:
   i) instigating a first prevention whereby the primary access point is prevented from advertising one or more roaming partners in common with the first access point;
   ii) determining whether the throughput meets or exceeds the throughput minimum following the first prevention;
   iii) when the throughput meets or exceeds the threshold, permitting the primary access point to continue advertising wireless spectrum availability for roaming partners remaining after the first prevention; and
   iv) when the throughput fails to meet or exceed the threshold, instigating a second prevention whereby the primary access point is prevented from advertising roaming partners in common with the second access point.

3. The method of claim 2 further comprising:
   determining a signal strength for each of the first and second access points; and
   determining the first access point as the one of the secondary access points having the greatest signal strength.

4. The method of claim 2 further comprising:
   determining a number of clients for each of the first and second access points; and
   determining the first access point as the one of the secondary access points having the least number of clients.

5. The method of claim 2 further comprising:
   determining a signal strength and a number of clients for each of the first and second access points;
   determining whether the signal strengths of the first and second access points are within a signaling strength range;
   when the signaling strengths are within the signaling strength range, determining the first access point as the one of the secondary access points having the lower number of clients; and
   when the signaling strengths fail to be within the signaling strength range, determining the first access point as the one of the secondary access points having the greater signal strength.

6. The method of claim 1 further comprising implementing a disassociation process when the throughput remains less than the minimum throughput after implementing the advertisement process, the dissociation process iteratively disassociating one or more of the plurality of clients having completed the association process according to an order specified in a ranking until the throughput meets or exceeds the threshold.

7. The method of claim 1 further comprising:
   comparing the roaming partners identified for the plurality of secondary access points to a listing of roaming partners associated with the primary access point;
   determining a first portion of the plurality of secondary access points to be identified with a roaming partner included within the listing and a second portion of the plurality of secondary access points to be identified with a roaming partner excluded from the listing;

determining the one or more roaming partners in common as the roaming partners included within the listing; and controlling the primary access point to advertise wireless spectrum availability for the roaming partners excluded from the listing while ceasing to advertise wireless spectrum availability for the one or more of the roaming partners included within the listing.

8. A non-transitory computer-readable medium having a plurality of non-transitory instructions executable with a processor to facilitate a load balancing for a wireless access point, the non-transitory instructions being sufficient for:

determining a first plurality of roaming partners permitted access to wireless spectrum available from the wireless access point;

determining a plurality of secondary access points in proximity to the wireless access point, including determining a second plurality of roaming partners permitted access to wireless spectrum available from the plurality of secondary access points;

comparing the first plurality of roaming partners to the second plurality of roaming partners to determine common roaming partners, the common roaming partners being each of the first plurality of roaming partners matching with one of the second plurality of roaming partners; and ceasing advertising availability of a wireless spectrum available from the wireless access point to a first roaming partner, the first roaming partner corresponding with one or more of the common roaming partners.

9. The non-transitory computer-readable medium of claim 8 wherein the non-transitory instructions are sufficient for:

advertising the wireless spectrum being available for each of the first plurality of roaming partners other than the first roaming partner after ceasing advertising the wireless spectrum being available to the first roaming partner; and determining whether a performance of the access point meets or exceeds a threshold after ceasing advertising the wireless spectrum being available to the first roaming partner.

10. The non-transitory computer-readable medium of claim 9 wherein the non-transitory instructions are sufficient for ceasing advertising the wireless spectrum being available to at least a second roaming partner of the common roaming partners when the performance is determined to fall below the threshold, the second roaming partner being one of the common roaming partners other than the first roaming partner.

11. The non-transitory computer-readable medium of claim 10 wherein the non-transitory instructions are sufficient for:

determining whether the performance of the access point meets or exceeds the threshold after ceasing advertising the wireless spectrum being available to the first roaming partner and the second roaming partner; and iteratively ceasing advertising the wireless spectrum being available to each of the roaming partners of the common roaming partners remaining after the first roaming partner and the second roaming partner on a one-by-one basis until the performance meets or exceeds the threshold.

12. The non-transitory computer-readable medium of claim 11 wherein the non-transitory instructions are sufficient for disassociating one or more of a plurality of clients having completed an association process sufficient for obtaining access to the wireless spectrum when the performance of the access point fails to meet or exceed the threshold after ceasing advertising the wireless spectrum being available to each of the common roaming partners.

13. The non-transitory computer-readable medium of claim 12 wherein the non-transitory instructions are sufficient for:

determining the performance to correspond with a minimum throughput, the minimum throughput representing a minimum data rate for wireless signaling carried over the wireless spectrum between the plurality of clients and the access point;

determining a throughput to represent an active data rate for wireless signaling being carried over the wireless spectrum between the plurality of clients and the access point; and iteratively disassociating the one or more of the plurality of clients according to an order specified in a ranking until the throughput meets or exceeds the threshold.

14. The non-transitory computer-readable medium of claim 13 wherein the non-transitory instructions are sufficient for:

determining a plurality of traffic types associated with wireless signaling being carried over the wireless spectrum for the one or more of the plurality of clients; and determining the order as a function of the plurality of traffic types, including determining the order such that one or more of the plurality of clients associated with a first traffic type of the plurality of traffic types are disassociated prior to one or more of the plurality of clients associated with a second traffic type of the plurality of traffic types.

15. A method for load balancing a primary access point comprising:

determining a first plurality of roaming partners permitted access to wireless spectrum available from the wireless access point;

determining a plurality of secondary access points in proximity to the wireless access point, including determining a second plurality of roaming partners permitted access to wireless spectrum available from the plurality of secondary access points;

comparing the first plurality of roaming partners to the second plurality of roaming partners to determine common roaming partners, the common roaming partners being each of the first plurality of roaming partners matching with one of the second plurality of roaming partners; and ceasing advertising availability of a wireless spectrum available from the wireless access point to a first roaming partner, the first roaming partner corresponding with one or more of the common roaming partners.

16. The method of claim 15 further comprising, while ceasing to advertise wireless spectrum being available for the first partner, advertising wireless spectrum to be available from the primary access point for a second partner, including selecting the second partner to be one of the first plurality of roaming partners excluded from the second plurality of roaming partners.

17. The method of claim 16 further comprising, after ceasing to advertise wireless spectrum being available for the first partner and while continuing to advertise wireless spectrum being available for the second partner, expanding the advertisement process to include controlling the primary access point to cease advertising wireless spectrum being available for a third partner, including selecting the third partner to be one of the roaming partners included within both of the first and second plurality of roaming partners.

18. The method of claim 17 further comprising, when ceasing to advertise wireless spectrum being available for the third partner fails to achieve sufficient load balancing, further expanding the advertisement process to include controlling the primary access point to cease advertising wireless spectrum being available for each of the roaming partners included within both of the first and second plurality of roaming partners.

19. The method of claim 17 further comprising, when ceasing to advertise wireless spectrum being available for the third partner fails to achieve sufficient load balancing, implementing a disassociation process, the disassociation process forcing one or more clients authenticated to access wireless spectrum available from the primary access point to disassociate from the primary access point.

* * * * *